Dec. 3, 1963  C. E. THOMPSON  3,113,048
ELECTRODEPOSITION OF POLYMERS IN POROUS ELECTRODES
Filed April 21, 1960  2 Sheets-Sheet 1

Charles E. Thompson  Inventor

By *Olin B. Johnson*

Patent Attorney

Charles E. Thompson  Inventor
By Olin B. Johnson
Patent Attorney

United States Patent Office 3,113,048
Patented Dec. 3, 1963

3,113,048
ELECTRODEPOSITION OF POLYMERS IN POROUS ELECTRODES
Charles E. Thompson, Fanwood, N.J., assignor to Esso Research and Engineering Company, a corporation of Delaware
Filed Apr. 21, 1960, Ser. No. 23,772
4 Claims. (Cl. 136—86)

This invention relates to improvements in systems wherein combustible fuels are oxidized and a substantial portion of the resulting energy of oxidation is converted directly, i.e. via electrochemical reaction, to electrical energy.

In particular, this invention relates to the discovery of a novel and highly efficient electrode for use in the oxidation of a fuel gas or liquid in a fuel cell, to the operation of fuel cells wherein such electrodes are employed and to methods for preparing such electrodes.

More particularly, this invention relates to fuel cell electrodes comprising a porous electron conductor, the larger pores of which have deposited thereon a high molecular weight polymer, and to the use of such electrodes in the generation of electricity.

A device wherein an electric current is produced directly from combustible materials by electrochemical reaction has become known in the art as the "fuel cell."

The true fuel cell differs from other primary batteries in that fuel is continuously or intermittently, preferably continuously, supplied to the cell and the electrodes of the cell are not consumed.

The requisites of an operating fuel cell include two electrodes, an electrolyte, an oxidizing gas and a continuous or intermittent supply of combustible fuel.

In fuel cell operations an electrode through which a source of oxygen is introduced to the cell is commonly known as an "oxygen electrode." An electrode through which a combustible fuel is introduced to the cell or which accepts electrons from fuel admitted directly to the electrolyte is commonly known as a "fuel electrode."

The maximum difference in potential between the electrodes of an individual cell is limited by the free energy change occurring in the reaction taking place in the cell. Most practical applications for the fuel cell therefore envision the use of a number of individually small cells connected in series and/or parallel. The desideratum therefore is a cell having as high a capacity as possible per unit volume.

An individual fuel cell is ordinarily made up of a cell container, two or more conducting electrodes consisting of or impregnated with catalytic material, insulators, connecting means associated wtih each electrode for establishing electrical contact with an external circuit, means for introducing an oxidizing gas to a cathode, means for introducing fuel to an anode, and an electrolyte. The electrolyte is electronically non-conductive but must be a medium in which ionic mobility can be achieved.

In the operation of such a cell employing a basic electrolyte, oxygen is reacted with the aqueous electrolyte solution to form at the oxygen electrode negatively charged ions which migrate to the vicinity of the fuel electrode where fuel is oxidized to form carbon dioxide and/or water. With an acid electrolyte water is formed at the oxygen electrode.

Carbon dioxide and/or water is formed when the fuel reacts and free electrons are thereupon released upon a conducting surface of the fuel electrode. When current is drawn from the cell there is a net flow of electrons from the fuel electrode (anode) through the external circuit to the oxygen electrode (cathode).

The fuels suitable for use in cells of this type include hydrogen, hydrocarbons, and oxygenated hydrocarbons.

The electrodes of this invention are suitable for use in any cell of this type employing an aqueous electrolyte and a liquid or gas fuel. Cells of this type ordinarily will not be operated above about 600° F. or below room temperature, i.e. about 70° F., and will operate at pressures in the range of about 1 to about 50 atmospheres.

When a gaseous reactant is employed in a fuel cell having a liquid electrolyte the area wherein electrochemical activity occurs is that area wherein the electrolyte, the reactant gas and the electrode catalyst are simultaneously exposed to each other. For this reason the most efficient fuel cell electrodes known have been made with a foraminated or porous structure comprising an electron conductor and a catalyst to accelerate the rate of reaction. Ordinarily, an electrode of this type comprises a porous conducting base impregnated with the catalytic material.

This invention is concerned with the problem of electrode flooding by an aqueous electrolyte. It is a problem particularly prevalent in cells wherein electrodes comprising non-metallic electrodes, e.g. porous carbon and analogous porous conductive materials, are employed and the invention is herein exemplified by the techniques employed to solve such problems with such electrodes.

Porous carbon when properly prepared and employed in a cell provides an excellent means of obtaining the high incidence of three phase contact, i.e. gas, liquid and solid, necessary for electrochemical reaction at effective rates. Carbon alone, however, does not possess sufficient catalytic activity to accelerate the desired reactions to a practical rate. However, when employed in electrochemical cooperation with a suitable catalyst a superior fuel cell electrode results. In this cooperation the porosity of the carbon provides first the proper gas and liquid distribution to afford the requisite points of simultaneous contact with the catalyst and at the same time serves as an electron conductor for establishing contact with an external circuit. The catalyst in chemical and/or physical association with the conducting surface serves to accelerate the reaction. For an electrode of this type to function properly the porous base must provide a group of pores of sufficient diameter to allow the reactant gas to occupy a large amount of the pore volume in opposition to the forces tending to flood such areas with the liquid electrolyte without the use of unduly high gas pressures. These pores, however, also have a practical upper limit since exceedingly large pores permit the oxidizing gas to bubble out into the electrolyte solution and adversely affect the reaction at the anode. In addition to these larger pores a second group of much smaller pores is necessary. In these smaller pores the forces of capillary action allow the electrolyte to occupy the pore space in opposition to the gas pressure. Where the liquid filled smaller pores connect with the larger gas filled pores an area of three phase contact is established. If catalytic material is present at this junction the desired electrochemical reaction takes place.

If, however, the liquid electrolyte enters not only the smaller pores but also encroaches into the larger pores necessary for gas distribution the electrode becomes flooded with electrolyte, the necessary three phase contacts are diminished and the desired electrochemical reaction is either reduced or terminated.

This problem is accentuated after the cell has been in operation for some time and is particularly troublesome at the cathode where the oxidizing gas reacts with the aqueous electrolyte solution at the electrode surface. Oxidation of the electrode increases the wettability of the pore surfaces with the result that the electrolyte advances into the larger pores reducing the activity of the cell. To a lesser degree this problem may also occur at a fuel electrode or anode designed to diffuse a gaseous fuel in like manner to the diffusion of oxidizing gas at the oxygen electrode.

It has now been discovered that coating the internal surfaces of the larger pores of the carbon with a thin layer of a halogen-containing polymer reduces the problem of pore flooding and greatly enhances the effectiveness of the cell.

Halogen-containing polymers that may be electro-deposited in pores of electrodes include fluorocarbon polymers, substituted fluorocarbons wherein one or more fluorine atoms are replaced by hydrogen, chlorine or bromine, e.g. polytetrafluoroethyl, polytrifluoroethylene, polyvinyl fluoride, polyvinylidene fluoride, polytrifluorochloroethylene, and copolymers of different fluorocarbon monomers, e.g. copolymers of tetrafluoroethylene and hexafluoropropylene. Fluorocarbon polymers are far superior to other polymers for improving electrode performance. Of these, polytetrafluoroethylene and the copolymer of tetrafluoroethylene and hexafluoropropylene are preferred.

The desired coating of the walls of the larger pores with solid polymers such as polytetrafluoroethylene can be effected by electrophoretic deposition of small particles of such polymers from an aqueous dispersion of the same. This process provides a method for coating pores with polymers which would be difficult, if not impossible, to form by polymerization of the corresponding monomer in situ. After deposition a further treatment of the coated electrode material, hereinafter discussed in detail, renders such material suitable for long effective use in an operating cell. Electrodeposition of polymerized fluorocarbons, preferably polymers of tetrafluoroethylene, may be carried out in the following manner.

The polymer is dispersed in an aqueous medium as particles having a size of the order of $1 \times 10^3$ A. Aqueous dispersions of polytetrafluoroethylene are obtainable in the open market. The preperation of such dispersions is described in U.S. Patent 2,478,229. The wetting properties of this suspension may be improved by adding a wetting agent, preferably of the non-ionic type, e.g. a polyethylene p-octyl phenol ether such as that sold under the trade name of "Triton X-100" by Rohm & Haas Co. Anionic or cationic type wetting agents may be used if they do not coagulate the dispersion. For best results the pH of the suspension is adjusted to 6.0–8.0 by slurrying with a carboxylic acid ion exchange resin. One suitable resin for such use is Amberlite IRC-50. This resin is a synthetic organic polymer containing substituent carboxylic acid groups capable of effecting cation exchange. Other ion exchange resins that may be used are "Permutit 216," "Wafatit C," "Alkalex" and "Duolite CS-100." The porous fuel cell electrode is immersing in this dispersion and the pressure adjusted to fill the large pores with liquid. The electrode is connected to any direct current source such as a battery so that it acts as a positive electrode if the dispersed particles are negatively charged. Contacts may be reversed where the dispersed particles carry a positive charge. The other electrode in the dispersion may be a metal and should be in close propinquity to the fuel cell electrode being impregnated.

Current is passed through the electrodes causing the polymer particles to migrate to the oppositely charged electrode by electrophoresis. These particles are discharged at the surface to form a film of polymer over the surface of these pores which are filled by the dispersion.

It has also been found that films can be formed from a codispersion of polytetrafluoroethylene and a film forming polymer such as polyisobutylene, butyl rubber, polyalkylacrylate polyalkyl methacrylate or a butadiene-acrylontirile copolymer. The film forming polymer should be a material that will decompose or melt below the decomposition temperature of the polytetrafluoroethylene or other halogen containing polymer to be left on the electrode. The deposition of this codispersion has the advantage of forming a more continuous film after drying and sintering. The film forming polymer is used with polytetrafluoroethylene in the proportion of about 5–30 parts film forming polymer to 100 parts of polytetrafluoroethylene. Deposition of the polymer or polymers may be carried out at coating times of 2 to 60 seconds at currents of about 0.1 to 1.0 ampere and initial voltages of about 3 to 30 volts. The fuel cell electrode is then removed from the suspension and purged with a gas to remove excess liquid and dried, e.g. at a temperature of about 200° F. The electrode is then heated to a temperature at which the tetrafluoroethylene polymer begins to decompose slowly, e.g. in the range of about 600° to 750° F. The electrode is then cooled. This effects a firm bonding of the polymer to the porous carbon. During this sintering step the film forming polymer is decomposed leaving a continuous coating of polytetrafluoroethylene over the surface of the pore. The electrode is then ready for use in a fuel cell. The smaller pores which serve as electrolyte conduits during operation of the cell have diameters which will not permit entry of the polymer and hence are not coated. Further control of the pore sizes to be coated can be effected by first filling all pores with a gas and then lowering the pressure on the system until liquid displaces such gas only in pores having diameters in excess of a predetermined size. The smaller pores are left uncoated to provide areas in which the catalyst is exposed. The points of intersection between the coated and uncoated pores provide a multiplicity of points at which electrolyte and reactant i.e. fuel or oxidant, meet in the presence of a catalyst.

Thus, the aforedescribed technique may be advantageously employed with any material suitable for use as a conducting surface in a fuel cell electrode wherein a portion of the porosity is employed as a means or conduit for the distribution of a reactant gas to establish multiple points of contact with a liquid electrolyte.

When porous carbon electrodes are employed, the porous carbon structure preferably has a maximum pore diameter which does not exceed $4 \times 10^5$ A. More preferably, about 20 to 80% of the pore volume results from pores of a diameter in the range of $0.2 \times 10^4$ A. to $2 \times 10^5$ A., and 20 to 80% of the pore volume results from pores of a diameter in the range of 50 to 400 A. The preferred carbon structures have an internal area, i.e. pore surface area of about 100 to 300 square meters per gram. Porous carbon electrodes having these properties and the methods for their preparation are described in detail in the copending application Serial No. 19,795, filed April 4, 1960 of which I am a coinventor with Charles W. Foust.

The catalysts employed with the fluorocarbon impregnated electrodes of this invention may be any of the catalytic materials heretofore successfully demonstrated in the art, in addition to novel catalysts hereinafter mentioned.

Thus, the catalyst may be a metal of groups I–B, V–B, VI–B, and VIII of the periodic table, manganese, mixtures of such elements and inorganic compounds containing at least one of such elements and oxygen. The sulfides of such metals also provide desirable catalytic effects. Catalysts which may be used effectively at the cathode include Au, Ag, Pt, Pd, Rh, Ir, oxides of transition metals, e.g. MnO, CoO, NiO, etc. or mixtures of the same. Cataysts employed at the anode include Pt, Ni, Co, $Cr_2O_3$, Rh, Pd, $V_2O_5$, $MoS_2$, $WS_2$, Au, Ag, MnO, $MnMoO_4$, and $CoMoO_4$. Of these, cobalt molybdate is preferred.

Where the conducting base and the catalyst of the electrode are not one and the same, the catalytic material will usually constitute between 0.1 and 30 wt. percent of the completed electrode. The percentage will vary within this range in accordance with the catalytic component employed. For example, when a noble metal such as platinum or palladium is employed, the impregnated electrode will contain between 0.1 and 5 wt. percent of the catalyst whereas when other metals are used, the catalyst will usually comprise from about 1 to 30, preferably 5 to 15 wt. percent of the electrode. Various methods for impregnating a porous electrode with such catalysts are disclosed in the aforementioned copending application, Serial No. 19,795.

The electrodes described herein are suitable for use in cells employing aqueous electrolytes of strong bases such as KOH, NaOH, LiOH, etc. and in those employing aqueous electrolytes of strong acids such as aqueous solutions of $H_2SO_4$, $H_3PO_4$, HCl, $HNO_3$, perchloric acid or other strong acids. They are, of course, also suitable for use in aqueous carbonate electrolytes, e.g. $K_2CO_3$—$KHCO_3$, $Na_2CO_3$—$NaHCO_3$.

Liquids and gases suitable for use as fuels in cells employing an aqueous electrolyte include hydrocarbons, oxygenated hydrocarbons, e.g. alcohols, ketones, aldehydes, carboxylic acids, etc., carbon monoxide and hydrogen.

For a better understanding of the present invention, its objects and advantages, reference should be had to the accompanying drawings.

Figure 6:
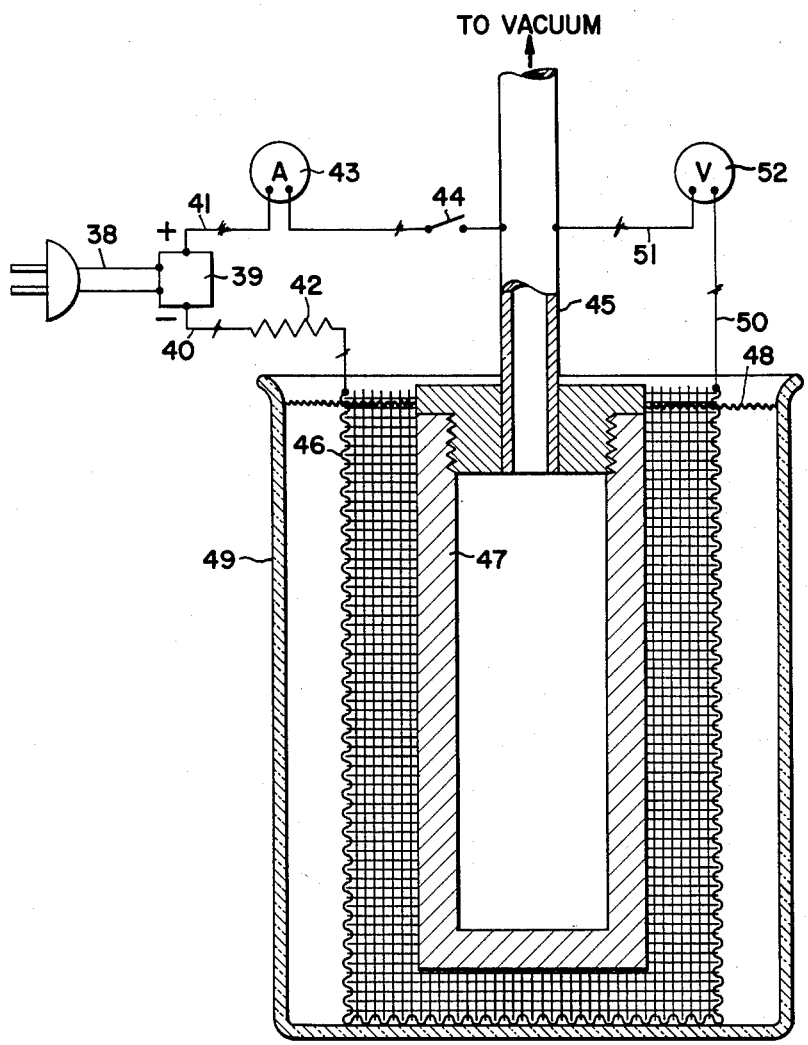
FIGURE 6 is a diagrammatic vertical section of an apparatus which may be used to effect electrodeposition of a polymeric material upon internal surfaces of a porous electrode.

Referring now to FIGURE 6, one embodiment of the method described hereinbefore for the electrodeposition of fluorocarbons upon the surfaces of the larger pores of a porous carbon electrode is carried out in the following manner: Into rectifier 39, a conventional device for converting alternating current to a current suitable for use in electrodeposition processes, e.g. direct current, a source of alternating current is introduced from outlet 38. Rectifier 39 is in electrical connection with electrodes 46 and 47 via wires 40 and 41, resistance means 42, ammeter 43, contact switch 44, and metal connector 45. Resistance means 42 provides a means of controlling the flow of electrical energy through the electrodes. Connector 45 is a metal plug shaped to fit into a cylindrical porous electrode and having a hollow tube communicating with the interior of the electrode at one end and with a vacuum producing source, e.g. a pump, at the other. Electrode 46 is a brass wire screen serving as the negative electrode. Electrode 47 is a porous carbon cylinder serving here as the positive electrode. Between electrodes 46 and 47 is an aqueous electrolyte 48 having a pH in the range of about 6.0 to 8.0 and containing the dispersion of polymer to be deposited on electrode 47. Electrodes 46 and 47 are both positioned within a glass beaker 49 which serves as a container for the electrolyte of the electrodeposition cell and connected via wires 50 and 51 to a voltmeter 52. The pressure inside the central cavity of electrode 47 is reduced by withdrawing air via the tube in connector 45 and the larger pores, e.g. those having a diameter above about 7500 to 80000 A. are filled with the aqueous electrolyte containing the dispersion of polymer. Switch 44 is closed and a current is passed through the system. Negatively charged particles of the polymer are attracted to the positive electrode 47 and into the larger pores thereof filled with electrolyte where they contact the pore walls and lose their negative charge and are deposited upon the carbon surface. Electrode 47 is then removed from the electrodeposition cell and heated to bond the polymer to the pore walls as hereinbefore described. If a plate-like electrode is to be coated in this manner modifications can easily be made in this design by one skilled in the art to permit a reduction in pressure upon the entire interior of container 49.

Figure 1:
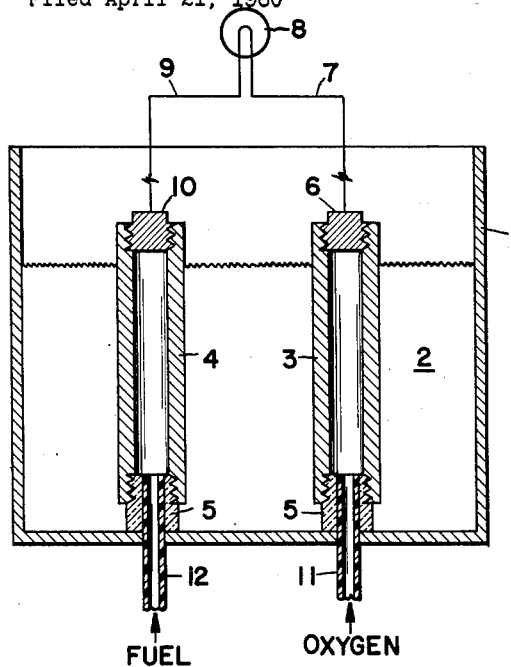
FIGURE 1 is a diagrammatic vertical section of a fuel cell wherein cylindrical diffusion type electrodes are employed in a system using an aqueous electrolyte and a gaseous fuel.

Referring now to FIGURE 1, one embodiment of the invention is carried out in the following manner: Into fuel cell container 1, a vessel contructed of stainless steel, containing an aqueous electrolyte solution 2, e.g. about 27 wt. percent potassium hydroxide, are immersing an "oxygen" electrode 3 and a "fuel" electrode 4. The electrodes are hollow cylinders impregnated with a catalytic material of the type hereinbefore described. The aqueous solution of potassium hydroxide 2 serves as an electrolyte and is maintained at a temperature in the range of about 77° to 500° F. Electrodes 3 and 4 are insulated from container 1 by conventional porcelain insulators 5 threaded and shaped to fit into threads in the bottom of the electrodes. The top portion of electrodes 3 and 4 are in electrical contact with connecting means 6 and 10 respectively which in turn are respectively in electrical contact with copper wires 7 and 9. Wires 7 and 9 are also in electrical contact with conventional resistance means 8 representing an external load, e.g. an incandescent lamp, electric motor, etc., for utilizing the power output of the cell and completing the external circuit. Connecting means 6 and 10 are constructed of copper, silver, stainless steel, or similar materials which are good conductors of electrical current and are here in the form of plugs or screws shaped to fit into threads formed into the top parts of electrodes 3 and 4. Portions of electrodes 3 and 4 are shown cut away to reveal the hollow nature of the electrodes and the porous structure of their walls. The cell is operated at 1 to 50 atmospheres pressure.

Oxygen gas is passed through conduit 11 into the interior of electrode 3 from whence it diffuses through the pores or tortuous passageways in the carbon wall to contact the electrolyte which also enters the electrode through the smaller pores thereof. A hydrocarbon gas is passed through conduit 12 into the interior of electrode 4 and diffuses in like manner through the pores of the electrode and contacts the aforesaid electrolyte. An electrochemical reaction is thereby initiated and electrical current is generated by such reaction and passed through the external circuit. Conduits 11 and 12 may be conventional glass, metal or plastic tubing. Fuel and oxygen feeds are maintained at a pressure sufficient only to keep the electrolyte out of the larger pores in the electrodes.

Figure 2:
FIGURE 2 is a greatly magnified illustration of a cross sectional view of a porous carbon electrode having connecting large and small pores wherein the larger pore is coated with a polymeric material deposited on and bonded to the surfaces of such pore by the aforedescribed processes of electrodeposition and sintering.

FIGURE 2 is designed to show a larger pore which is filled with gas during operation of the cell and a large number of small pores intersecting the larger pore in which liquid electrolyte overcomes gas pressure thereby creating a multitude of contact points between the oxidant or fuel and the electrolyte where such pores intersect the larger gas filled pore. The larger pore is coated with a thin layer of a high molecular weight polymer formed in situ.

Figure 3:
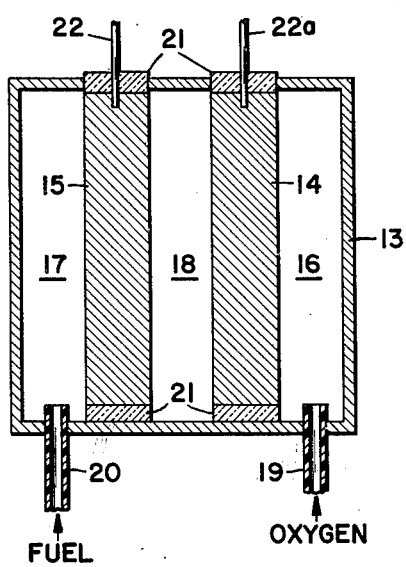
FIGURE 3 is a diagrammatic vertical section of a fuel cell wherein the conducting electrodes are plate-like structures which may be either flat, angular or curved in accordance with desired embodiments of this basic design.

In FIGURE 3, a cell employing plate-like electrodes, the space inside cell container 13 is divided by a porous cathode, i.e. oxygen electrode 14, and a porous carbon, cobalt molybdate impregnated anode, i.e. fuel electrode 15, into an oxygen receiving zone 16, a fuel receiving zone 17 and electrolyte compartment 18. Oxygen is introduced into oxygen receiving zone 16 via conduit 19. Fuel gas is introduced into fuel receiving zone 17 via conduit 20. Electrodes 14 and 15 are insulated from cell container 13 by conventional insulators 21. Connecting means 22 and 22a form the beginnings of an external circuit.

Figure 4:
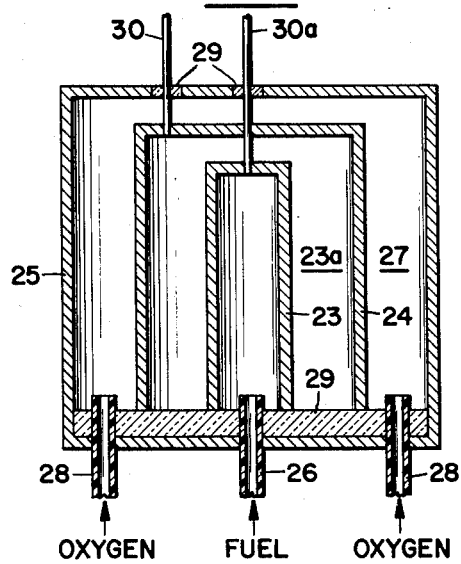
FIGURE 4 is a diagrammatic vertical section of a fuel cell wherein the fuel electrode is a hollow cylinder situated within the central cavity of a larger cylinder serving as the oxygen electrode.

In a cell of the type shown in FIGURE 4, a porous carbon-cobalt molybdate containing hollow cylinder 23 is situated inside a larger porous cylinder 24 which serves as the "oxygen electrode." Oxygen electrode 24 is in turn surrounded by cell container 25. A fuel gas is introduced into the interior of electrode 23 via conduit 26. Oxygen is introduced into an oxygen receiving zone 27 between electrode 24 and cell container 25 via conduit 28. An aqueous electrolyte 23a separates electrodes 23 and 24. Electrodes 23 and 24 are insulated from cell container 25 by conventional insulating means 29. Connecting means 30 and 30a form the beginnings of an external circuit for withdrawing electrical power from the cell.

Aside from the differences in construction, the operation of the cells shown in FIGURES 3 and 4 is essentially the same as that described with reference to the cell shown in FIGURE 1.

Figure 5:
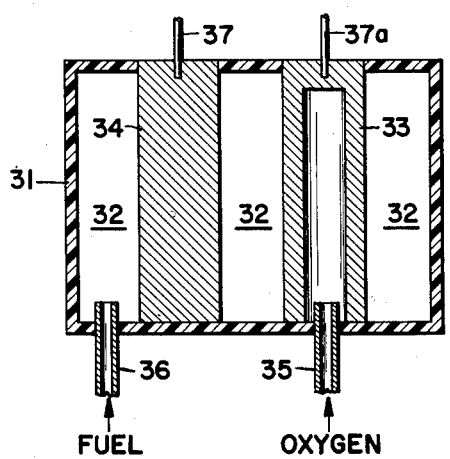
FIGURE 5 is a diagrammatic vertical section of a fuel cell for use in a system wherein a liquid fuel is admitted to the electrolyte before contacting the fuel electrode.

FIGURE 5 represents a somewhat different type of cell which is suitable for use with a liquid fuel, e.g. liquid hydrocarbons or oxygenated hydrocarbons such as alcohols, ketones, aldehydes and carboxylic acids. In FIGURE 5, the cell container 31 encloses an aqueous electrolyte 32 in which are immersing a cathode 33 in the form of a hollow structure, e.g. porous carbon impregnated with about 10 wt. percent NiO, and a porous carbon and cobalt molybdate anode 34. Oxygen is admitted to the interior of electrode 33 via conduit 35. A liquid fuel, e.g. methanol, is introduced into electrolyte 32 via conduit 36. Connecting means 37 and 37a represent the beginnings of an external circuit for removing an electrical current from the cell. Since a distribution of both gas and liquid within the "fuel electrode," i.e. the anode, is not required here, the existence of dual porosity is not of the importance in a cell of the type shown in FIGURE 5 that it is in the cells employing a gaseous fuel. However, it is still desirable. Maximum area of contact between fuel electrode and the liquid fuel is here the major consideration, but effective distribution throughout the electrode is enhanced by the existence of an appreciable number of larger feeder pores.

The following examples are presented for purposes of illustration only and the details therein should not be construed as limitations upon the true scope of the invention as set forth in the claims.

EXAMPLE 1

Porous carbon cylinders and plates having an apparent density in the range of 1.2 to 2.1 grams/cubic centimeter, and an internal surface area, i.e. pore surface area, in the range of 100 to 300 square meters/gram were impregnated with various fuel cell catalysts by soaking in an aqueous solution of a soluble salt of the catalytic material followed by heating in an inert gas to decompose soluble salts adhered to the carbon surface. These carbon structures have a maximum pore diameter of $4 \times 10^5$ A. and a pore distribution wherein 20 to 80% of the pore volume results from pores having diameters in the range of 50 to 400 A. and 20 to 80% of the pore volume results from pores having diameters in the range of $0.2 \times 10^4$ A. to $2 \times 10^5$ A.

Embodiment A

One such electrode was prepared by soaking the carbon cylinder in a 10 wt. percent aqueous solution of palladium nitrate, decomposing the nitrate by heating under nitrogen and treating with hydrogen gas at about 900° F. The impregnated carbon mass was found to contain about 1.1 wt. percent palladium.

A commercially available suspension of small particles of polytetrafluoroethylene was prepared for electrodeposition upon the larger pores of the carbon electrode in the following manner. The suspension (Teflon 41BX) was poured into a separatory funnel and allowed to separate into an aqueous layer and an organic or oil layer. A portion, i.e. 656 grams, of the aqueous layer was withdrawn and to this were added 40 grams of a solution comprising about 30 grams of distilled water and about 10 grams of an emulsifying agent (Triton X–100). The resulting stabilized suspension was then slurried with 200 cc. of an ion exchange resin (Amberlite IRC–50) and allowed to stand overnight. The ion exchange resin was then filtered from the suspension and the suspension was added to the container of an electrodeposition cell such as that shown in FIGURE 6 of the accompanying drawings. The carbon cylinder was then immersed in the electrodeposition liquid, i.e. the polymer suspension, and a vacuum pump was used to reduce the pressure in the inside of the cylinder to 0.5 cm. of mercury. The carbon cylinder was attached to the positive pole of a direct current rectifier and a brass screen was used as the cathode. A current of 0.82 ampere was passed through the circuit at 5.8 volts for ten seconds. The carbon cylinder was then withdrawn from the electrodeposition cell and excess polytetrafluoroethylene peeled from its surface. The cylinder was then dried for 2 hours at 200° F. and further dried overnight at 230° F. The cylinder was then sintered in a nitrogen atmosphere at 700° F. for one-half hour. The tetrafluoroethylene coated electrode was then ready for use.

Embodiment B

A porous carbon cylinder was impregnated with palladium chloride and the palladium chloride was decomposed and reduced in hydrogen to leave about 1 wt. percent palladium metal over the surface of the carbon. A suspension of polytetrafluoroethylene particles was prepared for electrodeposition as follows: To a portion, i.e. 286 grams, of the aqueous suspension which had been separated from the oil layer of a commercially available suspension (Teflon 41BX) were added 21 grams of a solution comprising about 16 grams of distilled water and about 5 grams of an emulsifying agent. The resulting diluted suspension was slurried with 100 cubic centimeters of an ion exchange resin (Amberlite IRC–50) and allowed to stand overnight. A commercially available suspension of a butadiene-acrylonitrile resin (Hycar 1561) was slurried with a second portion of the ion exchange resin and allowed to stand overnight. The two suspensions were then filtered from the ion exchange resin. The polytetrafluoroethylene suspension was added to about 73 grams of the butadiene-acrylonitrile suspension stirring slowly. The mixed dispersion was then added to the electrodeposition cell. The palladium impregnated porous carbon electrode was then immersed in the liquid in the electrodeposition cell and the pressure on the inside of the cylinder was reduced to 1 cm. of mercury. A current of 0.9 ampere was passed for 10 seconds through the circuit at a voltage of 4 volts. The carbon cylinder was then removed from the electrodeposition bath, excess polymer removed from its surface and dried for 2 hours at 200° F. and further dried overnight at 230° F. The cylinder was then sintered in a nitrogen atmosphere at 710° F. for one-half hour. The electrode was then ready for use in a fuel cell.

Embodiment C

A carbon cylinder was impregnated with ammonium molybdate and cobalt acetate in amounts sufficient to leave about 8 wt. percent $CoMoO_4$ impregnated upon the cylinder after heating to decompose the original compounds and form the $CoMoO_4$.

A polytetrafluoroethylene suspension was prepared for the electrodeposition bath as follows: A suspension of the aforementioned polymer (Teflon 41BX) was separated to remove the oil layer and to the aqueous portion were added about 15 grams of an emulsifying agent and 48 grams of distilled water. The resulting stabilized suspension was slurried with 200 cubic centimeters of (Amberlite IRC–50) an acidic ion exchange resin and allowed to stand overnight. The resin was filtered from the suspension and 517 grams of the fluorocarbon suspension were added slowly with stirring to 131 grams of a butadieneacrylonitrile resin (Hycar 1561) suspension which had also been slurried with the same ion exchange resin overnight. The mixed dispersion was then added to the electrodeposition cell and the $CoMoO_4$ impregnated carbon cylinder immersed therein. The pressure on the inside of the cylinder was reduced to 15" of mercury and a current of 0.74 ampere was passed through the circuit at 14.5 volts for ten seconds. The cylinder was then removed from the electrodeposition cell, the excess polymer removed from its surface, and dried at 200° F. for 2 hours followed by drying at 230° F. overnight. The electrode was then sintered in a nitrogen atmosphere for one-half hour at 725° F. The cylinder was then ready for use as a fuel cell electrode.

EXAMPLE 2

An example of the superior performance of an electrode which has had its large pores coated with polytetrafluoroethylene, hereinafter referred to as "Teflon," is illustrated in the following table. A porous carbon cylinder such as those described in Example 1, which contained 1.5% Pd dispersed over its surface was used as the oxygen electrode of a fuel cell which had a fuel electrode consisting of 12.5% cobalt molybdate on porous carbon. The open circuit potential at 300° F. and 300 p.s.i.g. when using 27% KOH as electrolyte was 0.69 volt when ethane was used as fuel and oxygen as oxidant. During the period of 3–6 hours of operation of the cell, the oxygen electrode was polarized to the extent of 0.56 volt when a current of only 3.6 amps./ft.$^2$ was drawn from the cell. The large pores of this electrode were then coated with Teflon by the method described in embodiment A of Example 1 and it was again put in a fuel cell with the same fuel electrode. The open circuit potential of the cell was 0.74 volt. During the period of 3–6 hours of operation under the same conditions as described above, the oxygen electrode was polarized only to the extent of 0.11 volt when a current of 16.6 amps./ft.$^2$ was drawn from the cell. Thus, after electrodeposition of Teflon on the walls of the large pores of the electrode, it was polarized to only one-fifth of the extent it had been before application of the Teflon and the current being drawn was nearly five times as great from the electrode after Teflon deposition. The polarization of the Teflon coated electrode occurring at 3.6 amps./ft.$^2$ was only 0.02 volt or 1/28 of that obtained under the same current density before Teflon coating.

TABLE I

| | Open Circuit E.M.F., Volts | Run Hours | Current Density, Amps./ft.$^2$ | Polarization at $O^2$ Electrode, Volts |
|---|---|---|---|---|
| Electrode 244 (before Teflon coating of larger pores) | .069 | 3–6 | 3.6 | 0.56 |
| Electrode 244 (after Teflon coating of larger pores) | 0.74 | 3–6 | 3.6 | 0.02 |
| | 0.74 | 3–6 | 16.6 | 0.11 |

EXAMPLE 3

An electrode prepared as in embodiment B of Example 1 containing about 1.1 wt. percent palladium has its performance as an oxygen electrode compared in the following table with a similar carbon electrode which has no Teflon in its pores.

TABLE II

| | Open Circuit E.M.F., Volts | Run Hours | Current Density, Amps./ft.$^2$ | Polarization at $O^2$ Electrode, Volts |
|---|---|---|---|---|
| Electrode #257 (with Teflon in larger pores) | 0.76 | 16–18 | 9.8 | 0.28 |
| | 0.82 | 30–31 | 17.5 | 0.26 |
| | 0.82 | 30–31 | 5.1 | 0.09 |
| Electrode #211 (with no Teflon in any pores) | 0.60 | 0–5 | 5.0 | 0.36 |
| | 0.78 | 9–10 | 5.1 | 0.56 |

The fuel electrode against which the oxygen electrodes were matched in the cell was a porous carbon electrode containing 12.5% cobalt molybdate. Ethane was used as the fuel, and oxygen as the oxidant, and the cell was operated at 300° F. and 300 p.s.i.g. with 27% KOH as electrolyte. It can be seen in the table that the Teflon coated electrode gave a much superior performance. The non-coated electrode had a polarization of 0.36 volt at 5 amps./ft.$^2$ during the first 5 hours of its operation in the cell and this had increased to 0.56 volt during the 9–10 hours of operation at essentially the same current density. The coated electrode had a polarization of only 0.28 volt at 9.8 amps./ft.$^2$ during hours 16–18 of operation and this improved to 0.26 volt polarization at 17.5 amps./ft.$^2$ after 30 hours of operation. The polarization at 5.0 amps./ft.$^2$ at hours 30–31 of operation was only 0.09 or one-sixth of that observed with the non-coated electrode at 9–10 hours after starting operation of the cell.

EXAMPLE 4

A Teflon coated electrode impregnated with 1.5 wt. percent Pt was employed as the oxygen electrode in a 30 wt. percent aqueous $H_2SO_4$ electrolyte operated against a platinum on carbon fuel electrode. The cell was operated at atmospheric pressure at 94° F. The fuel employed was hydrogen gas. The open circuit potential was 1.02 volts and when a current of 47 amperes per sq. ft. was drawn from the cell the voltage at the oxygen electrode decreased to 0.7 volt.

This result was markedly superior to similar runs with uncoated electrodes.

Current density is calculated on the basis of external surface area of the electrode being tested.

EXAMPLE 5

A porous carbon electrode wherein the pores having diameters in excess of about 8000 A. are coated with a polymer of tetrafluoroethylene and wherein the smaller pores are impregnated with $WS_2$, is employed at the anode of a fuel cell and the procedure of Example 4 is repeated.

EXAMPLE 6

A porous carbon electrode impregnated with about 2.6 wt. percent platinum and 0.2 wt. percent gold is coated with a copolymer of tetrafluoroethylene and hexafluoropropylene as in Example 1 and used as the cathode in a fuel cell wherein ethyl alcohol is employed as the feed and the cathode is separated from the fuel by an ion permeable membrane. Improvement over similar uncoated electrodes is pronounced.

All percentages herein expressed refer to weight percent unless otherwise indicated or defined.

The symbol "A." is employed herein to designate angstroms or angstrom units of linear measure, i.e. 1/10,000 microns.

The term "high density carbon" is used herein to refer to a carbon mass having an apparent density of about 1.2 to about 2.1 grams/cc.

The term "low density carbon" is used herein to refer to a carbon mass having an apparent density of below about 1.2 grams/cubic centimeter.

The terms "apparent density" and "bulk density" as used herein refer to the weight of a cubic centimeter of porous material, no allowance being made for empty space therein constituting the porosity of such material.

The term "actual density" as used herein refers to the weight of a cubic centimeter of porous material, allowance being made for the porosity of such material, i.e. the weight of a cubic centimeter of the material in a non-porous solid state.

The terms "fuel cell reactant," "fuel cell fluid reactant," "fuel cell reactant fluid," "reactant fluid" and "reactant" are used herein to mean reactants taking part as such in the electrochemical reaction of the fuel cell including the source of oxygen, i.e. molecular oxygen, or an oxygen-containing gas, e.g. air, and the source of fuel which may be hydrogen, carbon monoxide, hydrocarbons or oxygenated hydrocarbons, but excluding the electrolyte employed in the cell even though such electrolyte participates in the electrochemical reaction as a reactant.

The terms "source of fuel," "fuel source," "fluid fuel source" and "vaporized fuel source" are used herein to refer to the fuel cell reactants to be oxidized in the fuel cell, i.e. hydrogen, carbon monoxide, hydrocarbons and oxygenated hydrocarbons.

The term "porosity" is used herein in its conventional sense, i.e. a condition in which a solid body is penetrated by minute open spaces which may be filled with either liquids or gases. This porosity is expressed as the percentage of open-space volume with respect to the total volume.

The particular periodic table referred to herein is the 1959 Revised Edition of the table designed in 1924 by Henry D. Hubbard, revised since 1940 by William F. Meggers and published by W. M. Welch Mfg. Co., Chicago, Illinois.

What is claimed is:

1. A method for preparing a fuel cell electrode which comprises immersing a porous electron conductor having a series of major pores whose diameters are above about $0.2 \times 10^4$ A. and a series of minor pores of lesser diameter into an aqueous dispersion of polymer particles until said aqueous dispersion enters and occupies space in said major pores of said structure, passing a direct electric current through said structure at a rate equivalent to the passage of 0.1 to 1.0 ampere for 2 to 60 seconds thereby effecting electrodeposition of said particles within said major pores, removing said structure from said dispersion and heating said structure until said polymer deposited in said major pores is adhered to pore surfaces.

2. A process in accordance with claim 1 wherein said polymer contains a fluorocarbon monomer.

3. A method for preparing a fuel cell electrode which comprises immersing a porous carbon comprising structure having a series of major pores whose diameters are above about $0.2 \times 10^4$ A. and a series of minor pores of lesser diameter into an electrodeposition bath having a pH in the range of 6.0 to 8.0 and containing an aqueous dispersion of particles of a polymer of tetrafluoroethylene until said dispersion enters and occupies space in said major pores of said structure, passing a direct current through said structure at a rate equivalent to the passage of 0.1 to 1.0 ampere for 2 to 60 seconds until said polymer particles are deposited upon the surfaces of said major pores, drying said structure and heating the dried structure until deposited polymer is adhered to said major pores.

4. A process in accordance with claim 3 wherein said aqueous dispersion is diluted with a second dispersion of a film forming polymer having a lower temperature of decomposition than said tetrafluoroethylene polymer.

References Cited in the file of this patent

UNITED STATES PATENTS

| | | |
|---|---|---|
| 2,207,734 | Heise et al. | July 16, 1940 |
| 2,384,463 | Gunn et al. | Sept. 11, 1945 |
| 2,572,296 | Zimmerman et al. | Oct. 23, 1951 |
| 2,662,065 | Berry et al. | Dec. 8, 1953 |
| 2,800,447 | Grahm | July 23, 1957 |
| 2,820,752 | Heller | Jan. 21, 1958 |
| 2,912,478 | Justi et al. | Nov. 10, 1959 |

OTHER REFERENCES

Schildknecht: Vinyl & Related Polymers, 1952, pages 487–493.